US008831397B2

(12) United States Patent
Terashima et al.

(10) Patent No.: US 8,831,397 B2
(45) Date of Patent: Sep. 9, 2014

(54) VIDEO PLAYER, VIDEO PLAYBACK METHOD, AND CONTROL TARGET APPARATUS

(75) Inventors: Yoshiki Terashima, Kawasaki (JP); Keiichi Teramoto, Kawasaki (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 1131 days.

(21) Appl. No.: 12/021,996

(22) Filed: Jan. 29, 2008

(65) Prior Publication Data

US 2008/0219639 A1   Sep. 11, 2008

(30) Foreign Application Priority Data

Mar. 7, 2007   (JP) ................................ 2007-057449

(51) Int. Cl.
| *H04N 5/765* | (2006.01) |
| *H04N 7/16* | (2011.01) |
| *H04N 21/436* | (2011.01) |
| *H04N 21/432* | (2011.01) |
| *H04N 21/41* | (2011.01) |
| *H04N 9/82* | (2006.01) |
| *H04N 5/775* | (2006.01) |
| *H04N 5/783* | (2006.01) |

(52) U.S. Cl.
CPC ............... *H04N 5/765* (2013.01); *H04N 7/163* (2013.01); *H04N 21/43615* (2013.01); *H04N 9/8205* (2013.01); *H04N 5/775* (2013.01); *H04N 21/4325* (2013.01); *H04N 21/4135* (2013.01); *H04N 21/4131* (2013.01); *H04N 5/783* (2013.01)
USPC ............................ 386/200; 386/201; 386/216

(58) Field of Classification Search
USPC .................................... 386/46, 200–201, 216
See application file for complete search history.

(56) References Cited

U.S. PATENT DOCUMENTS

| 5,715,352 | A | * | 2/1998 | Han | ............................... | 386/244 |
| 2001/0050958 | A1 | * | 12/2001 | Kato | ........................ | 375/240.28 |
| 2007/0183755 | A1 | * | 8/2007 | Mae | .............................. | 386/112 |

FOREIGN PATENT DOCUMENTS

| JP | 9205607 | 8/1997 |
| JP | 2005-050126 | 2/2005 |
| JP | 2006261836 | 9/2006 |
| JP | 2007324829 | 12/2007 |

OTHER PUBLICATIONS

Office action from corresponding Japanese application No. 2007-057449 dated Dec. 9, 2008.

* cited by examiner

*Primary Examiner* — Ghazal Shehni
(74) *Attorney, Agent, or Firm* — Ohlandt, Greeley, Ruggiero & Perle, L.L.P.

(57) ABSTRACT

A video player reads, from a recording medium storing video data and control data, the control data which includes a plurality of operation control methods for a control target apparatus, each operation control method being set for one of a plurality of playback controls including a normal playback control and a special playback control, detects one of the playback controls which is requires, to obtain a detected playback control, plays back the video data in the recording medium in accordance with a playback control method corresponding to the detected playback control, and controls operation of the control target apparatus in accordance with one of the operation control methods in the control data which corresponds to the detected playback control.

11 Claims, 9 Drawing Sheets

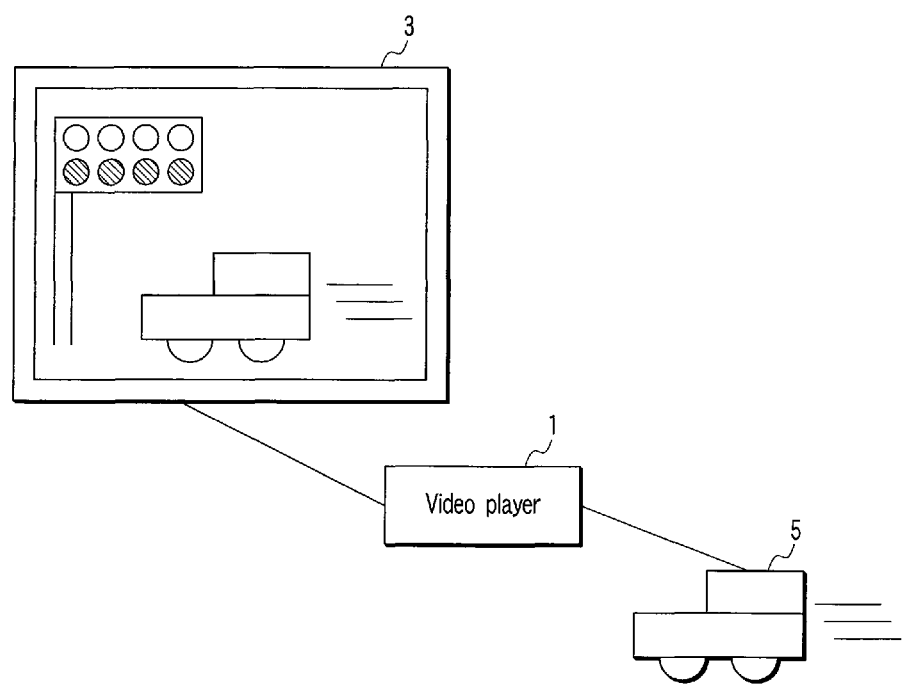
F I G. 2

| Type of request/type of current playback control | Playback control method | Elapsed time | | Operation control method for network device |
|---|---|---|---|---|
| Normal playback | Normal playback | 0 sec | ⇑ | Move forward |
| | | 10 sec | ⇑ | Stop |
| | | 20 sec | ⇑ | Produce engine sound |
| | | 30 sec | ⇑ | Suddenly start |
| | | 40 sec | ⇑ | Suddenly stop |
| Fast forward | Fast forward | Less than 40 sec | ⇑ | Stop running and produce engine sound |
| | | 40 sec or more | ⇑ | Stop running and stop producing engine sound |
| Slow playback | Slow playback | | ⇑ | Slowly move forward |
| Rewind | Rewind | | ⇑ | Slowly move backward |
| Chapter jump to scene corresponding to elapsed time of 30 sec | Chapter jump to scene corresponding to elapsed time of 30 sec | | ⇑ | Produce engine sound |

F I G. 3

| Request type | Current operation state of network device | | Operation control method for network device | Video playback control method | | Operation state of network device | | Video playback control method |
|---|---|---|---|---|---|---|---|---|
| Fast forward at triple speed | At halt | ⇑ | Move forward at speed 3 | Fast forward at double speed | ... | Device has reached speed 3 | ⇑ | Fast forward at triple speed |
| | Move forward at speed 3 | ⇑ | | Fast forward at triple speed | | | | |
| Normal playback | At halt | ⇑ | Operation control at time of normal playback | Normal playback | | | | |
| | Move forward at speed 3 | ⇑ | Stop | Fast forward at double speed | ... | Completely stop | ⇑ | Normal playback |

F I G. 5

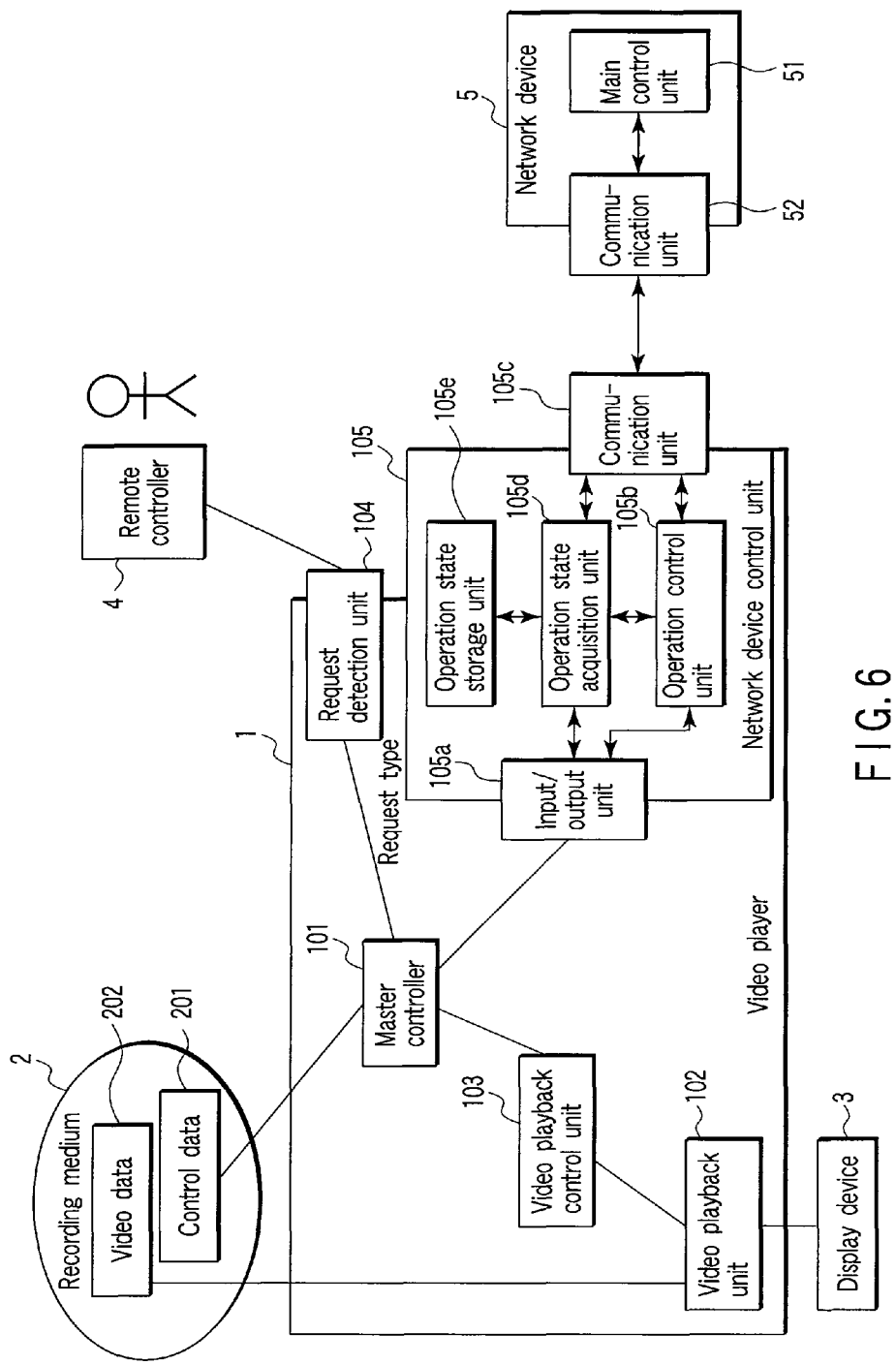
F I G. 6

VIDEO PLAYER, VIDEO PLAYBACK METHOD, AND CONTROL TARGET APPARATUS

CROSS-REFERENCE TO RELATED APPLICATIONS

This application is based upon and claims the benefit of priority from prior Japanese Patent Application No. 2007-057449, filed Mar. 7, 2007, the entire contents of which are incorporated herein by reference.

BACKGROUND OF THE INVENTION

1. Field of the Invention

The present invention relates to a video player which plays back video and controls an externally connected device.

2. Description of the Related Art

Recently, the development of network-communicable AV devices, white home appliances, and the like has progressed. As a protocol for controlling such network devices, Universal Plug and Play (UPnP), ECHONET (registered trademark), and the like have been standardized. Network-compatible digital TVs and the like have been commercially available, and home networks have become popular.

On the other hand, content has become more diversified. For example, according to HD DVD which is a next-generation DVD standard, using a content control description means called Advanced Content makes it possible to provide content with higher interactiveness than that in the prior art.

As one of the techniques using such a video player and network device, a technique for making the network device operate in synchronism with a video played back by the video player has been disclosed.

For example, reference (JP-A 2005-50126 (KOKAI)) discloses a technique for transmitting a temperature control signal to a cooking device as a network device in synchronism with the progress of a video in a cooking program. This can implement a service of allowing a user to actually proceed with cooking in accordance with a video in a cooking program while seeing it. In addition, according to reference, when the user wants to fast forward the playback of a video, the video player transmits a temperature control signal to the cooking device upon converting the signal in accordance with the fast forward operation so as to follow up the operation. This reference also refers to synchronous operation at the time of execution of special playback operation, e.g., automatically decreasing the fast forward speed of a video by feedback if a cooling process cannot follow up the fast forward operation.

The technique disclosed in reference, however, does not refer to any technique for controlling a network device if a user issues an instruction to perform special playback other than fast forward playback, such as "rewind" or "chapter jump". Furthermore, the technique disclosed in reference can synchronize a video with an actual cooking process in a high-performance cooking device by temperature control at the time of fast forward operation. However, with respect to a low-performance cooking device which cannot perform temperature control in time, this technique cannot perform operation such as making the video player temporally stop fast forward operation and displaying the corresponding information on the screen.

As described above, in a conventional system configured to make a control target device (network device) operate in synchronism with a video, it is impossible to make the device operate in accordance with the type of special playback control (in accordance with a video scene, playback speed, playback direction, or the like) at the time of special playback control such as "fast forward", "rewind", or "chapter jump".

BRIEF SUMMARY OF THE INVENTION

According to embodiments of the present invention, there is provided a video player including:

a read unit configured to read, from a recording medium storing video data and control data, the control data which includes a plurality of operation control methods for a control target apparatus, each operation control method being set for one of a plurality of playback controls including a normal playback control and a special playback control;

a detection unit configured to detect one of the playback controls which is requires, to obtain a detected playback control;

a video playback unit configured to play back the video data in the recording medium in accordance with a playback control method corresponding to the detected playback control; and a control unit configured to control operation of the control target apparatus in accordance with one of the operation control methods in the control data which corresponds to the detected playback control.

BRIEF DESCRIPTION OF THE SEVERAL VIEWS OF THE DRAWING

FIG. 2 is a view showing an example of the schematic overall arrangement of the system in FIG. 1;

FIG. 3 is a view showing an example of control data held in a recording medium;

FIG. 5 is a view showing another example of control data according to the second embodiment of the present invention;

FIG. 6 is a block diagram showing an example of the overall arrangement of a system according to the second embodiment;

DETAILED DESCRIPTION OF THE INVENTION

First Embodiment

Figure 1:
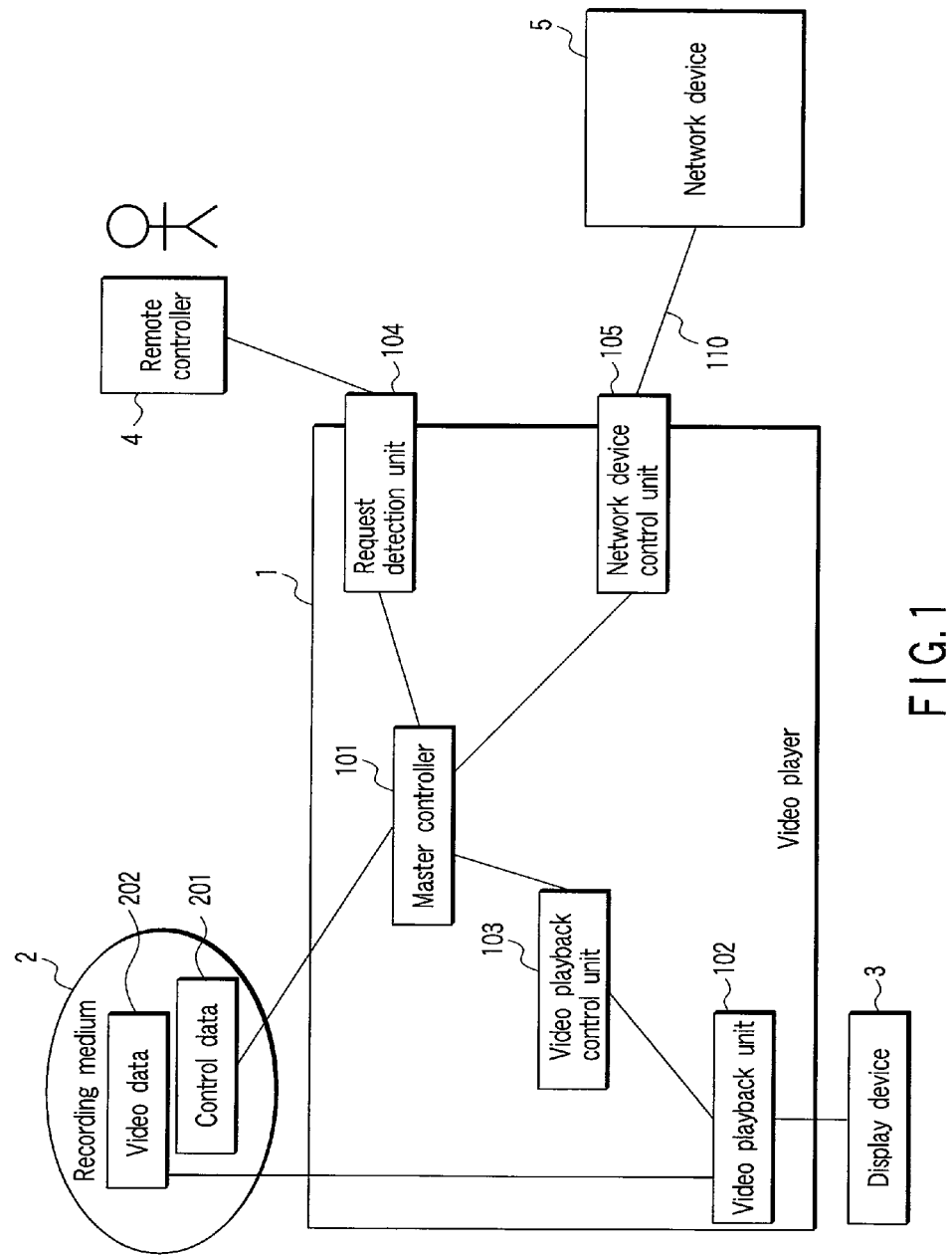
FIG. 1 is a block diagram showing an example of the overall arrangement of a system according to the first embodiment of the present invention.

A system according to the first embodiment includes a video player 1 and a network device 5 controlled by the video player 1, as shown in FIG. 1.

The video player 1 reads in content (control data 201 and video data 202) recorded on a recording medium 2 such as a DVD and displays the content on a display device 3 such as a TV set. Note that the video player 1 and the display device 3 may be connected to each other through a communication network 110 such as a home network or may directly connected to each other through a predetermined cable.

The user operates a remote controller 4 to issue requests to the video player 1 to perform playback control for special playback modes such as the fast forward mode of performing playback in the forward direction at a playback speed higher than a normal playback speed, the slow playback mode of performing playback at a playback speed lower than the normal playback speed, the rewind mode of performing playback in the reverse direction at a normal playback speed, the fast rewind mode of performing playback in the reverse direction at a playback speed higher than the normal playback speed, and the chapter jump mode of changing the playback start position of a given chapter to the head of another chapter, in addition to the normal playback mode of playing back video data at the normal playback speed and the playback stop mode. These requests from the user are transmitted as request signals from the remote controller 4 to the video player 1. For example, infrared rays can be used for communication between the remote controller 4 and the video player 1.

The network device 5 as a control target device of the video player 1 is connected to the video player 1 through the communication network 110 such as a home network. As a network protocol for communication between the video player 1 and the network device 5, for example, UPnP can be used, which is technical specifications for connecting home devices such as a personal computer, peripheral device, AV device, telephone, and home electrical appliance to each other and allowing them to mutually provide functions (services). The video player 1 and the network device 5 are physically connected to each other through a cable such as Ethernet (registered trademark), USB, or IEEE 1394 or connected to each other through 802.11a/b/g, Bluetooth (registered trademark), or the like.

The content recorded on the recording medium 2 contains the video data 202 and the control data 201 including a playback control method for the video data 202 which is set for each of a plurality of types of playback control including normal playback control and special playback control ("fast forward", "rewind", "chapter jump", and the like), an operation control method for the network device 5, and the like in addition to display designation description data such as the display position and display timing of the video data 202, and control processing description data such as data calculation.

For the description of the control data 201, for example, it is possible to use a content description language such as Hypertext Markup Language (HTML) or Broadcast Markup Language (BML) or a script language such as Javascript (registered trademark) or ECMAScript as in recent Web content, digital terrestrial broadcast content in Japan, and the like. The control data 201 will be described in detail later.

The arrangement of the video player 1 will be described next.

Assume that the recording medium 2 is set in the video player 1, and the user operates the remote controller 4. In this case, upon receiving a request signal such as a normal playback request, playback stop request, or one of special playback requests, a request detection unit 104 detects the type of requested playback control ("normal playback", "fast forward", "rewind", "chapter jump", "playback stop", or the like) from the received request signal, and notifies a master controller 101 of the type of detected request.

The master controller 101 reads the control data 201 from the set recording medium 2, and acquires the control data 201. The master controller 101 then performs video playback control on the video playback unit 102 and operation control on the network device 5 (through the video playback control unit 103 and the network device control unit 105) on the basis of the type of request notified from the request detection unit 104, the current operation state of the network device 5 notified from a network device control unit 105, the state of playback control on a video currently played back by a video playback unit 102 which is notified from a video playback control unit 103, the elapsed time from the head of a video which is used to specify a currently displayed scene, and the control data 201.

The video playback unit 102 reads the video data 202 from the recording medium 2 under the control of the video playback control unit 103. The video playback unit 102 then plays back the video data 202 and displays it on the display device 3 in accordance with control from the video playback control unit 103.

The video playback control unit 103 has a function (playback control) of controlling video playback on the video playback unit 102 under the control of the master controller 101, and a function of notifying the master controller 101 of the type of playback control currently performed on the video playback unit 102. In this case, the types of playback control include special playback controls including "slow playback", "n-times fast forward", "rewind", "chapter jump" to a given chapter, and the like in addition to "normal playback", "pause", "stop", and the like. The video playback control unit 103 identifies the scene currently played back by the video playback unit 102 in accordance with the elapsed time (playback position) from the head of the video data 202. That is, the video playback control unit 103 identifies, on the basis of the elapsed time from the head of the video data 202 which corresponds to the scene currently displayed on the video playback unit 102, whether the scene has reached a desired scene at the time of special playback control.

The network device control unit 105 has a function of acquiring the current operation state of the network device 5 from the network device 5, a function of receiving a state change notification signal transmitted from the network device 5 when the operation state of the network device 5 changes, and acquiring the current operation state of the network device 5 from the signal, a function of notifying the master controller 101 of the acquired operation state of the network device 5, and a function of transmitting, to the network device 5, a control signal for making the network device 5 operate in accordance with operation control from the master controller 101.

The control data 201 in the content held in the recording medium 2 will be described next.

A conventional system which controls a network device in synchronism with video playback often uses control data in which an instruction to send a control instruction to the network device in accordance with the elapsed time from the start of video playback is described. In the control data 201 in this embodiment, in addition to such a description specification, an operation control method for the network device and a playback control method for a video are described for each type of request from the user.

More specifically, in the control data 201, acquisition processing and detection processing of information like those described below are described as description specifications by an information acquisition API, a call back function registration API, and the like:

(1) the elapsed time from the head of a video which is acquired by the video playback control unit 103 and is used to specify a video scene currently played back by the video playback unit 102;

(2) notification information which is acquired by the video playback control unit 103 and indicates that the video playback unit 102 has reached a given video scene (the elapsed time from the head);

(3) the type of current playback control on the video playback unit 102 which is acquired by the video playback control unit 103;

(4) the current operation state of the network device 5 which is acquired by the network device control unit 105;

(5) a change in the operation state of the network device 5 and an operation state after the change which are acquired by the network device control unit 105; and (6) the type of request from the remote controller 4 which is acquired by the request detection unit 104.

Likewise, in the control data 201, an operation control method for the network device 5 and a playback control method for a video are described as description specifications by a control instruction API.

Even during special playback control such as "fast forward" or "pause" in the video playback unit 102, the master controller 101 exchanges data with the video playback control unit 103 and the network device control unit 105 at arbitrary timings conforming to the control data 201 independently of the playback control.

FIG. 2 shows an example of a content device cooperation application in which the network device 5 which is a network-controllable toy car operates in accordance with a video in synchronism with the display of video scenes depicting that, for example, a car runs and stops. According to this embodiment, when the user issues a request for special playback such as "fast forward" or "chapter jump" as well as when synchronous operation is performed at the time of normal playback, the toy car is made to perform operation corresponding to the request from the user on the basis of the control data 201 created by a content creator in advance.

FIG. 3 shows an example of the control data 201.

The network device 5 in FIG. 2 is a toy car to which the user can issue, for example, instructions to move forward, move backward, and produce an engine sound through a network. The video data 202 contained in the content together with the control data 201 includes, for example, a scene in which "a car which is moving forward slowly stops on a start line after the lapse of 10 seconds, produces an engine sound after the lapse of 10 seconds, suddenly starts after the lapse of 10 seconds, and suddenly stops after the lapse of 10 seconds".

As shown in FIG. 3, in the control data 201, a video playback control method and an operation control method for the network device 5 which correspond to the type of request are set. An operation control method for the network device 5 is set in correspondence with the elapsed time of video data like that described above. For the sake of simplicity, FIG. 3 shows control data in a table form. However, the present invention is not limited to this. That is, any description form can be used as long as it sets a playback control method and an operation control method for the network device 5 for each type of request.

Figure 8:
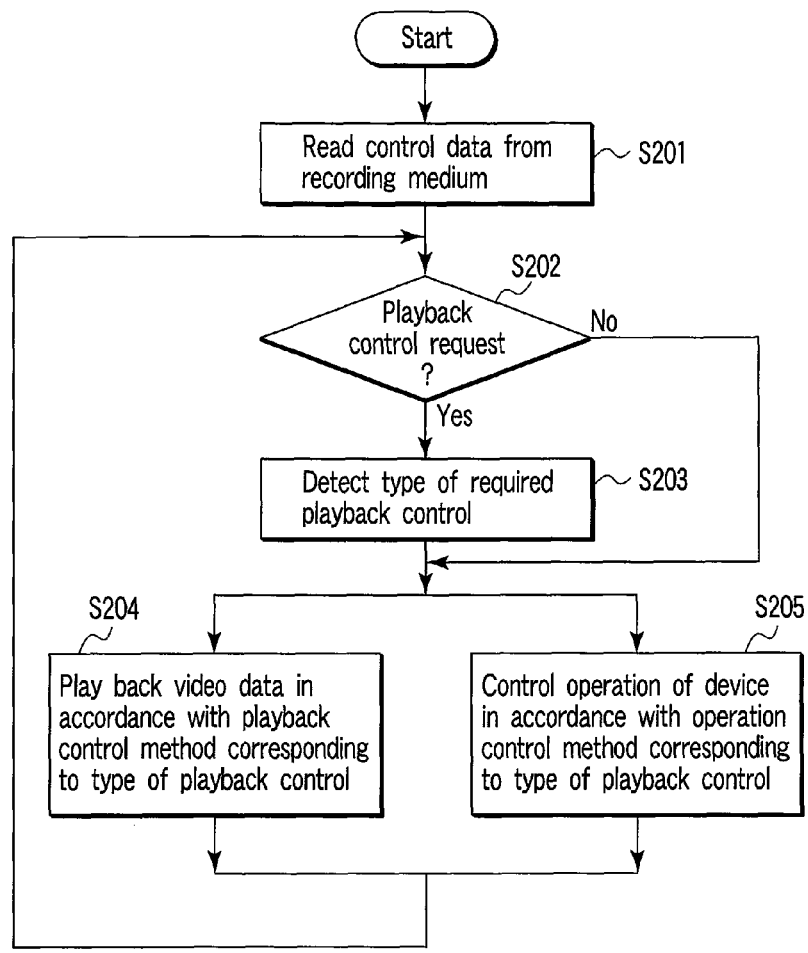
FIG. 8 is a flowchart for explaining the processing operation of the video player according to the first embodiment.

FIG. 8 is a flowchart for explaining the processing operation of the video player 1 according to the first embodiment. When the recording medium 2 is set in the video player 1, the master controller 101 reads the control data 201 from the recording medium 2 and stores the data in a predetermined memory (step S201). After predetermined initialization processing and the like are performed, the master controller 101 is set in a request wait state in which it can receive a request from the user. When the user issues a playback control request (step S202), the request detection unit 104 detects the type of request and notifies the master controller 101 of the detected request type (step S203).

The master controller 101 issues a control instruction to the video playback control unit 103 so as to play back a video in accordance with the playback control method corresponding to the type of detected playback control (in, for example, control data) (step S204). The master controller 101 also issues a control instruction to the network device control unit 105 so as to control the operation of the network device 5 in accordance with the operation control method in the control data which corresponds to the type of detected playback control (step S205).

When a new request for playback control from the user is detected, the process advances to step S203.

Note that if a playback control method corresponding to the type of playback control is described in the control data, video playback control is performed in accordance with the method in step S204. Alternatively, video playback control is performed by using the type of detected playback control as the playback control method at this time. If, for example, the detected type is "normal playback", the master controller 101 issues a "normal playback" instruction to the video playback control unit 103. If the detected type is "fast forward", the master controller 101 issues a "fast forward" instruction to the video playback control unit 103.

If the operation control method for the network device 5 which is set in accordance with the playback position (elapsed time) of video data for each type of playback control is described in the control data, in step S205, the master controller 101 controls the operation of the network device 5 in accordance with the operation control method in the above control data which corresponds to the playback position (elapsed time) of the video data notified from the video playback control unit 103.

If the control data contains another playback control method for video data which corresponds to the operation state of the network device 5 to which transition is made after the operation of the network device 5 is controlled in accordance with the above operation control method, the master controller 101 controls the operation of the network device 5 in accordance with the above operation control method in step S205. Thereafter, when the network device control unit 105 detects that the network device 5 has transitioned to the corresponding operation state, the master controller 101 plays back the video data in accordance with another playback control method. This makes it possible to perform special playback of a video in accordance with the operation of the network device 5.

The processing operations of the video player 1 and network device 5 in FIG. 1 will be described in more detail next with reference to FIG. 4 by taking the control data 201 shown in FIG. 3 as an example.

When the recording medium 2 storing content including the control data 201 in FIG. 3 and the above video data 202 is loaded in the video player 1, for example, the following initialization processing is performed. The master controller 101 reads the control data 201 from the recording medium 2 and stores the data in, for example, a memory in the master controller 101. The video playback control unit 103 resets the elapsed time to "0 seconds", and notifies the master controller 101 of the elapsed time "0 seconds". The network device control unit 105 detects the power on/off of the network device 5. Assume that the elapsed time is reset, and the elapsed time "0 seconds" is notified. In this case, when the power on of the network device 5 is detected, the master controller 101 is set in the request wait state in which it can receive a request from the user.

Figure 4:
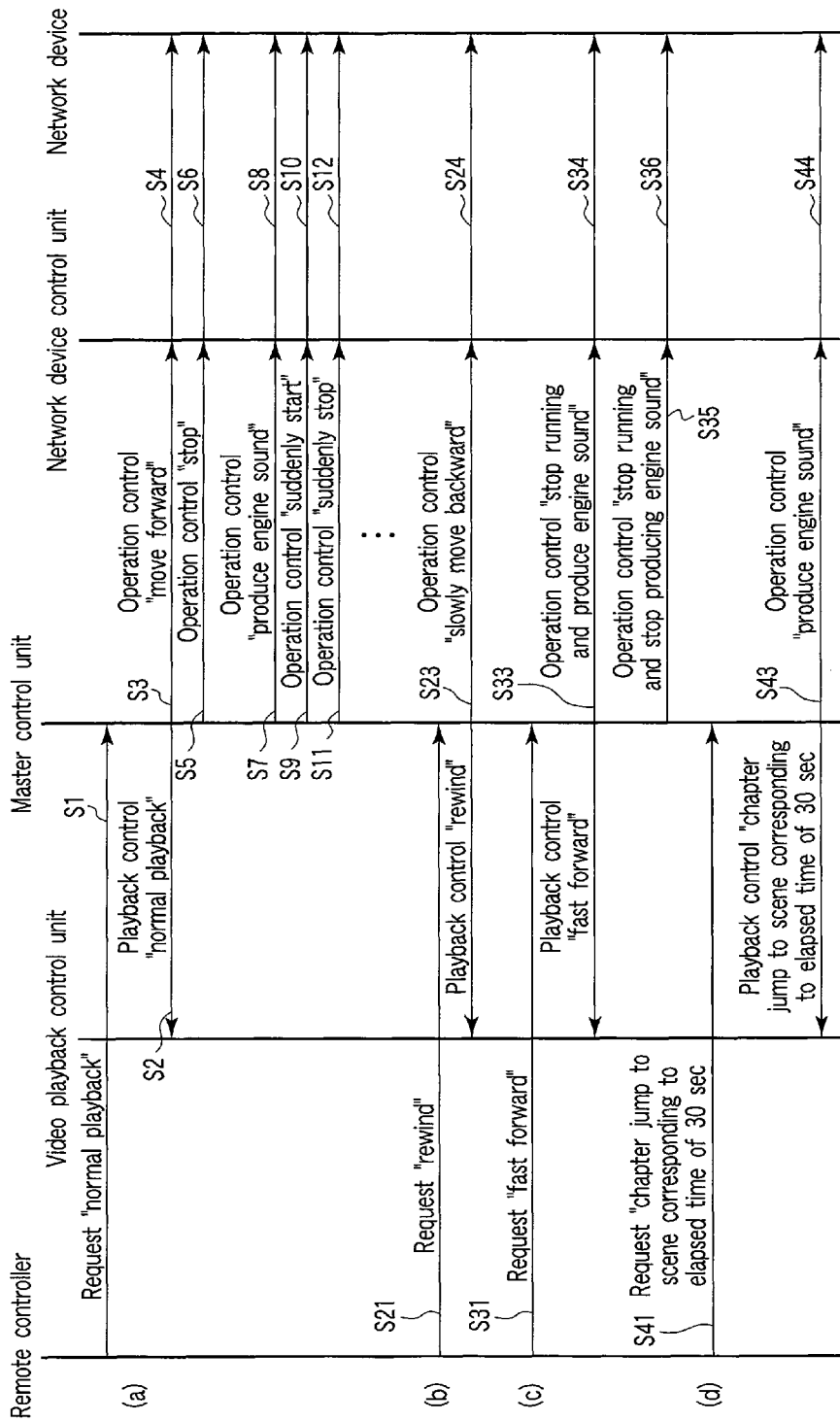
FIG. 4 is a sequence chart for explaining the processing operations of a video player and network device when the control data in FIG. 3 is used.

When the user operates the remote controller 4 in this request wait state and the request detection unit 104 detects a normal playback request, i.e., "normal playback" as the type of detected request (step S1 indicated by "(a)" in FIG. 4), the master controller 101 acquires the playback control method "normal playback" corresponding to the request type "normal playback" and the operation control method "move forward" for the network device 5 which corresponds to the elapsed time "0 seconds", and issues a "normal playback" instruction to the video playback control unit 103 (step S2), and also issues an operation control "move forward" instruction to the network device control unit 105 (step S3). Upon receiving the "normal playback" instruction, the video playback control unit 103 causes the video playback unit 102 to start normal playback of the video data 202 held in the recording medium 2. The network device control unit 105 also transmits a control signal instructing to "move forward" to the network device 5 to make the network device 5 move forward (step S4). The master controller 101 stores "normal playback" as the type of current playback control.

The video playback control unit 103 measures the elapsed time at the same time as the start of playback of video data, and notifies the master controller 101 of the elapsed time as needed or at predetermined time intervals. Note that in FIG. 4, the notification of the elapsed time from the video playback control unit 103 to the master controller 101 is omitted.

When the elapsed time "10 seconds" is notified to the master controller 101, the master controller 101 acquires the type "normal playback" as the current playback control and the operation control method "stop" for the network device 5 which corresponds to the elapsed time "10 seconds" in the control data 201 in FIG. 3, and issues the operation control "stop" instruction to the network device 5 (step S5). The network device control unit 105 transmits a control signal instructing to "stop" to the network device 5 to stop the network device 5 (step S6).

Likewise, when the elapsed time "20 seconds" is notified to the master controller 101, the master controller 101 acquires the type "normal playback" of the current playback control and the operation control method "produce engine sound" of the network device 5 which corresponds to the elapsed time "20 seconds" and issues the operation control "produce engine sound" instruction to the network device 5 (step S7). The network device control unit 105 transmits a control signal instructing to "produce engine sound" to the network device 5 to make the network device 5 produce an engine sound (step S8).

When the elapsed time "30 seconds" is notified to the master controller 101, the master controller 101 acquires the type "normal playback" of the current playback control and the operation control method "suddenly start" for the network device 5 which corresponds to the elapsed time "30 seconds" and issues the operation control "suddenly start" instruction to the network device 5 (step S9). The network device control unit 105 transmits a control signal instructing to "suddenly start" to the network device 5 to make the network device 5 suddenly start (step S10).

When the elapsed time "40 seconds" is notified to the master controller 101, the master controller 101 acquires the type "normal playback" of the current playback control and the operation control method "suddenly stop" for the network device 5 which corresponds to the elapsed time "40 seconds" and issues the operation control "suddenly stop" instruction to the network device 5 (step S11). The network device control unit 105 transmits a control signal instructing to "suddenly stop" to the network device 5 to make the network device 5 suddenly stop (step S12).

In this manner, when the type of request from the user is "normal playback", the master controller 101 issues an operation control instruction to the network device control unit 105 in accordance with the elapsed time from the head of video data notified by the video playback control unit 103. That is, the toy car as the network device 5 performs operations, i.e., moving forward, stopping, producing an engine sound, suddenly starting, and suddenly stopping, in the order named in synchronism with displayed scenes of the video data 202.

Consider next a case in which the user operates the remote controller 4 to issue a request to "rewind", that is, the request detection unit 104 detects "rewind" as a type of request (step S21 indicated by "(b)" in FIG. 4). In the control data 201 in FIG. 3, if the type of request is "rewind", "rewind" is set as a video playback control method, and "slowly move backward" is set as an operation control method for the network device 5 regardless of the elapsed time.

When "rewind" is detected as a type of request, the master controller 101 acquires the playback control method "rewind" corresponding to the request type "rewind" in the control data 201 in FIG. 3 and the operation control method "slowly move backward" for the network device 5, and issues a "rewind" instruction to the video playback control unit 103 (step S22), and also issues an operation control "slowly move backward" instruction to the network device control unit 105 (step S23). Upon receiving the "rewind" instruction, the video playback control unit 103 makes the video playback unit 102 start rewinding the video data 202. At this time, the video playback control unit 103 also returns the elapsed time in accordance with the rewinding operation of the video playback unit 102. In addition, the network device control unit 105 transmits a control signal instructing to "slowly move backward" to the network device 5 to make the network device 5 slowly move backward (step S24).

Consider next a case in which the user operates the remote controller 4 to issue a request to "fast forward", that is, the request detection unit 104 detects "fast forward" as a type of request (step S31 indicated by "(c)" in FIG. 4). In the control data 201 in FIG. 3, if the type of request is "fast forward" and the elapsed time is "less than 40 seconds", "fast forward" is set as a video playback control method, and "stop running and produce engine sound" is set as an operation control method for the network device 5. In this case, if the elapsed time is "40 seconds or more", "fast forward" is set as a video playback control method, and "stop running and produce engine sound" is set as an operation control method for the network device 5.

When "fast forward" is detected as a type of request, the master controller 101 issues a "fast forward" instruction to the video playback control unit 103 to make the video playback unit 102 start fast forward operation (step S32). The master controller 101 stores "fast forward" as the type of current playback control and instructs the network device control unit 105 to perform operation control on the network device 5 in accordance with the request type/playback control type "fast forward" in the control data 201 in FIG. 3 and the current elapsed time of the video data notified (or acquired) from the video playback control unit 103. Note that the video playback control unit 103 also advances the elapsed time in accordance with the fast forward operation of the video playback unit 102.

The master controller 101 performs operation control on the network device 5 while checking the elapsed time of the video data during fast forward operation which is notified from the video playback control unit 103 as needed. If the elapsed time notified from the video playback control unit 103 is less than 40 seconds at the time of detection of "fast forward" as a type of request, the master controller 101 instructs the network device control unit 105 to perform the operation control "stop running and produce engine sound" on the network device 5 which corresponds to the request type "fast forward" and the elapsed time "less than 40 seconds" in the control data 201 in FIG. 3 (step S33). The network device control unit 105 transmits a control signal to make the network device 5 stop running while producing an engine sound (step S34). Upon being notified of the elapsed time "40 seconds" of the video data during fast forward operation from the video playback control unit 103, the master controller 101 instructs the network device control unit 105 to perform the operation control "stop running and stop producing engine sound" on the network device 5 which corresponds to the request type "fast forward" and the elapsed time "40 seconds or more" in the control data 201 in FIG. 3 (step S35). Upon receiving the above instruction, the network device control unit 105 transmits a control signal to the network device 5 to make the network device 5, which has stopped running, also stop producing any engine sound (step S36).

If the elapsed time notified from the video playback control unit 103 is 40 seconds or more at the time of detection of "fast forward" as a type of request, the master controller 101 issues a "fast forward" instruction to the video playback control unit 103 to make the video playback unit 102 start fast forward operation, and also instructs the network device control unit 105 to perform the operation control "stop running and stop producing engine sound" on the network device 5 which corresponds to the request type "fast forward" and the elapsed time "40 seconds or more" in the control data 201 in FIG. 3. Upon receiving the above instruction, the network device control unit 105 transmits a control signal to the network device 5 to make the network device 5 stop running and stop producing any engine sound.

In this manner, if a request from the user is "fast forward", the toy car as the network device 5 keeps producing an engine sound in the interval between the instant immediately after the user presses the fast forward button of the remote controller 4 and the instant when a video scene showing that the car stops is displayed after the fast forward operation proceeds (at the time of 40 seconds).

Consider next a case in which the user operates the remote controller 4 to output a request to make a chapter jump to a scene 30 seconds after the head of a video, and the request detection unit 104 detects "chapter jump to scene 30 seconds after" as a request type (step S41 indicated by "(d)" in FIG. 4).

In the control data 201 in FIG. 3, in the case of this request type, "chapter jump to scene 30 seconds after" is set as a playback control method, and "produce engine sound" is set as an operation control method for the network device 5. The video scene 30 seconds after the head of the video data is a scene showing that the car suddenly starts.

When the request detection unit 104 detects "chapter jump to scene 30 seconds after", the master controller 101 acquires the playback control method "chapter jump to scene 30 seconds after" corresponding to the request type "chapter jump to scene 30 seconds after" and the operation control method "produce engine sound" for the network device 5 in the control data 201 in FIG. 3, and instructs the video playback control unit 103 to play back the video data from the scene 30 seconds after the head of the video (step S42). The master controller 101 also instructs the network device control unit 105 to perform the operation control "produce engine sound" (step S43). As a result, the video playback unit 102 resumes video playback from the scene showing that "the car suddenly starts" which corresponds to the elapsed time of 30 seconds after the head of the video data 202, and the network device control unit 105 makes the network device 5 produce an engine sound upon receiving the "produce engine sound" instruct (step S44). Note that when the "produce engine sound" instruction is received while the network device 5 is running, it suffices to make the network device 5 stop running and only produce an engine sound.

In this manner, when the user operates the remote controller 4 to perform "chapter jump to scene 30 seconds after", the toy car immediately keeps producing an engine sound. When the video chapter jump is complete and video playback is resumed from the scene showing that "car suddenly starts", the toy car actually starts running at the same time.

A chapter jump is the operation of jumping from a preceding chapter to a totally different scene, and hence the toy car may exhibit unnatural connection between behaviors. As described above, however, describing operation control (operation control which naturally connects the operation of the network device 5 to operation in the scene at the jump destination) on the network device 5 at the time of a chapter jump in the control data 201 can make the toy car operate relatively naturally, like "start after revving up the engine".

The control data in FIG. 3 corresponds to the case in which an operation control method for the network device 5 is set in accordance with the elapsed time of the video data 202, and the operation of the network device 5 is synchronized with a video scene. However, the method of synchronizing the operation of the network device 5 with a video scene is not limited to this.

If, for example, the network device control unit 105 has a function of acquiring the operation state of the network device 5 (if the network device 5 has a function of notifying the network device control unit 105 of the operation state of the network device 5), it is possible to synchronize the operation of the network device 5 with a video by changing the video playback control method in accordance with the operation state of the network device 5. That is, the control data 201 contains not only a playback control method for the video data 202 and an operation control method for the control target device, which are set for each of a plurality of types of playback controls including normal playback control and special playback control, but also another playback control method corresponding to the operation state of the network device 5 to which transition is made after the operation of the network device 5 is controlled in accordance with the above operation control method. When the request detection unit 104 detects the type of playback control requested by the user, the master controller 101 controls the video playback control unit 103 and the network device control unit 105 by using the playback control method and the operation control method, in the control data, which correspond to the type of request. If the network device 5 has transitioned to the operation state designated by the above control data afterward, the master controller 101 controls the video playback control unit 103 in accordance with another playback control method corresponding to the operation state which is contained in the above control data.

As described above, the recording medium 2 stores video data 202 and control data 201, the control data 201 including a plurality of operation control methods for a control target apparatus (network device 5), each operation control method being set for one of a plurality of playback controls including a normal playback control and a special playback control. The video player 1 described above plays back the video data 202 in the recording medium 2 in accordance with a playback control method corresponding to the type of required playback control and also controls the operation or the movement of the network device 5 in accordance with an operation control method corresponding to the type of required playback control. This makes it possible to cause the network device 5 to operate in accordance with the type of special playback control (in accordance with a video scene, playback speed, playback direction, or the like) at the time of video special playback control.

Second Embodiment

In the control data 201 in FIG. 5, a video playback control method and an operation control method for the network device 5 are set in accordance with a request type and the operation state of the network device 5.

A network device 5 controlled by the control data 201 in FIG. 5 is a toy car to which a control instruction to move forward or backward at a designed speed can be issued through a network 110 and from which the current running speed can be acquired through the network 110. When an instruction to "move forward at speed 3" is issued while the toy car is at a halt, the toy car immediately starts running. However, since the time for acceleration is required, it takes several seconds to actually reach "speed 3".

When the control data 201 in FIG. 5 is used, even if the user operates a remote controller 4 to issue an instruction to "fast forward at triple speed" while normal playback is being performed, a master controller 101 does not immediately instruct a video playback control unit 103 to fast forward the video at triple speed. First of all, it is necessary to check the current operation state of the toy car as the network device 5 through a network device control unit 105.

That is, according to the control data 201 in FIG. 5, if "fast forward at triple speed" is detected as a request from the user and the current operation state of the toy car as the network device 5 is "moving forward at speed 3", "fast forward at triple speed" is set as a playback control method for the video playback control unit 103 while the network device 5 is made to keep running at speed 3 (without operation control). If the current operation state of the network device 5 is "at halt", "move forward at speed 3" is set as an operation control method for the network device 5, and "fast forward at double speed" is set as a playback control method for the video playback control unit 103 instead of "fast forward at triple speed". When the video playback control unit 103 keeps fast forwarding at double speed and the speed of the network device 5 reaches "3" (the operation state of the network device 5 changes to "move forward at speed 3"), "fast forward at triple speed" is set as a playback control method for the video playback control unit 103.

According to the control data 201 shown in FIG. 5, when the user issues a "fast forward" request, the toy car as the network device 5 starts running at the same time when the request is detected. As the toy car accelerates, the fast forward speed of the display video increases.

When the fast forward state returns to the normal playback state, the master controller 101 controls the video playback unit 102 through the video playback control unit 103 to gradually return the playback speed of the video to the normal playback speed as the toy car decelerates.

When "normal playback" is detected as a request from the user and the current operation state of the toy car as the network device 5 is "fast forwarding at speed 3", "stop" is set as an operation control method for the network device 5 in the control data 201 in FIG. 5, and "fast forward at double speed" is set as a playback control method instead of "normal playback" in the control data 201. When the fast forward state at double speed continues without any change and the network device 5 completely stops (the operation state of the network device 5 changes to "stop"), "normal playback" is set as a playback control method. In addition, if the current operation state of the network device 5 is "at halt", "normal playback" is set as a playback control method.

When the control data 201 shown in FIG. 5 is to be used, the network device control unit 105 acquires the operation state of the network device 5, and notifies the master controller 101 of the current operation state of the network device 5 when detecting a change in the operation state of the network device 5, or at predetermined time intervals, or in accordance with a request from the master controller 101.

The network device 5 also notifies the network device control unit 105 of the current operation state of the network device 5 when the operation of the network device 5 changes, or in accordance with a request from the network device control unit 105, or at predetermined time intervals.

FIG. 6 shows an example of the arrangements of the network device control unit 105 and network device 5. The same reference numerals as in FIG. 6 denote the same parts in FIG. 1.

The network device 5 includes a main control unit 51 and a communication unit 52. The communication unit 52 communicates with the network device control unit 105 by using a predetermined protocol, receives a control signal, and transmits the current operation state of the network device 5. The main control unit 51 controls the master operation of the network device 5. If the network device 5 is a toy car, the main control unit 51 controls the running, stopping, speed, and the like of the toy car in accordance with control signals received by the communication unit 52. The main control unit 51 also holds the current operation state of the network device 5 which indicates, for example, that the network device 5 is at halt or at which speed the network device 5 is running, and notifies the network device control unit 105 of the current state through the communication unit 52. The main control unit 51 may transmit a new operation state after a change to the network device control unit 105 through the communication unit 52 every time the operation state changes.

The network device control unit 105 includes an input/output unit 105a, operation control unit 105b, communication unit 105c, operation state acquisition unit 105d, and operation state storage unit 105e.

An operation control instruction which is issued from the master controller 101 to the network device 5 and input through the input/output unit 105a is transferred to the operation control unit 105b. The operation control unit 105b transmits a control signal to the network device 5 through the communication unit 105c in accordance with the operation control instruction.

The operation state acquisition unit 105d acquires the current operation state of the network device 5 from it by issuing an operation state acquisition request to the network device 5 at predetermined time intervals (in accordance with a predetermined protocol) or issuing an operation state acquisition request to the network device 5 upon receiving a request from the master controller 101. In addition, the operation state acquisition unit 105d can always acquire the latest operation state of the network device 5 by making the network device 5 transmit a new operation state every time the operation state changes.

The operation state storage unit 105e stores the current operation state of the network device 5 which is acquired by the operation state acquisition unit 105d. Every time acquiring an operation state from the network device 5, the operation state acquisition unit 105d compares the acquired operation state with the operation state stored in the operation state storage unit 105e. If they differ (a change in operation state is detected), the operation state acquisition unit 105d updates the operation state held in the operation state storage unit 105e with the new operation state (the operation state after the change). In the above manner, the operation state acquisition unit 105d notifies the master controller 101 of the current operation state of the network device 5, which is held in the operation state storage unit 105e when a change in the operation state of the network device 5, when a request is received from the master controller 101 through the input/output unit 105a, or at a predetermined timing, as described above.

Note that the network device control unit 105 need not always comprise the operation state storage unit 105e. In this case, upon receiving an operation state notification from the network device 5, the network device control unit 105 notifies the master controller 101 of the corresponding information. Upon receiving a request from the master controller 101, the network device control unit 105 acquires an operation state from the network device 5. If it is necessary to notify the master controller 101 of the current operation state of the network device 5 (when a predetermined timing has come), the network device control unit 105 communicates with the network device 5 to acquire the current operation state.

Figure 9:
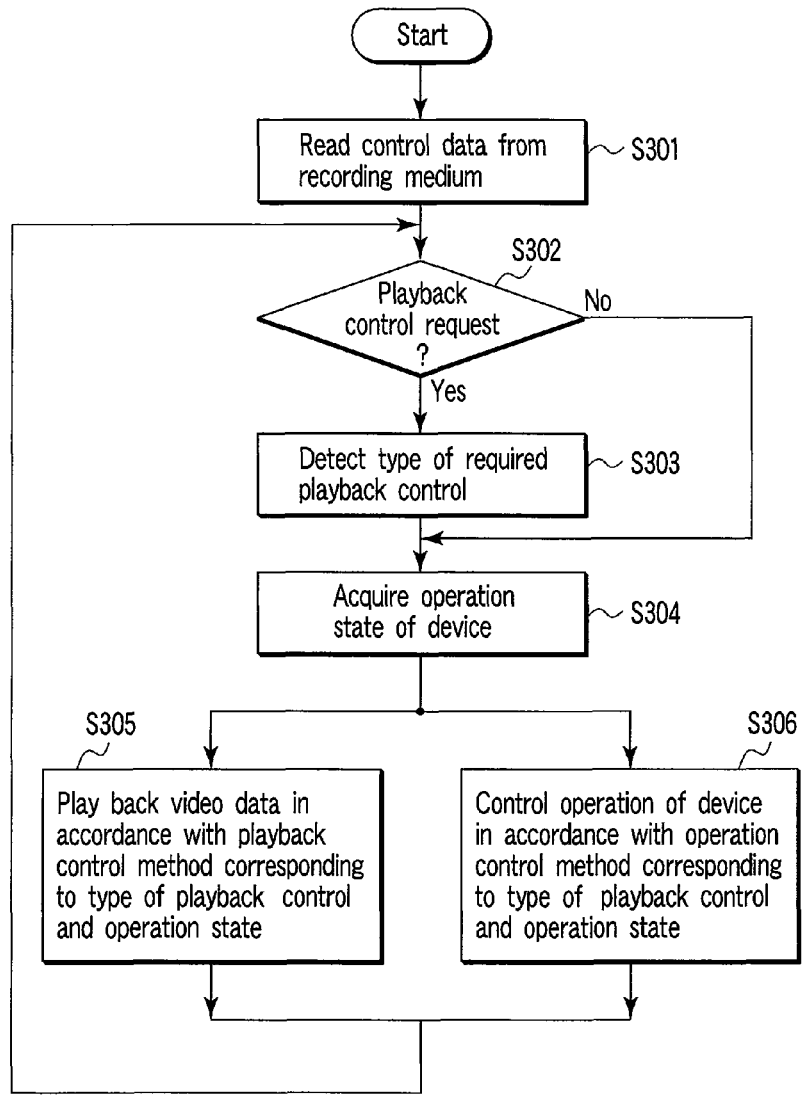
FIG. 9 is a flowchart for explaining the processing operation of a video player 1 according to the second embodiment.

FIG. 9 is a flowchart for explaining the processing operation of the video player 1 according to the second embodiment. When the recording medium 2 is set in the video player 1, the master controller 101 reads the control data 201 from the recording medium 2 and stores the data in a predetermined memory (step S301). After predetermined initialization processing and the like are performed, the master controller 101 is set in a request wait state in which it can receive a request from the user. When the user issues a playback control request (step S302), the request detection unit 104 detects the type of request and notifies the master controller 101 of the type of detected request (step S303).

The master controller 101 acquires the current operation state of the network device 5 from the network device control unit 105 (step S304), and issues a control instruction to the video playback control unit 103 so as to play back a video in accordance with the playback control method in the control data which corresponds to the type of detected playback control and the acquired operation state of the network device 5 (step S305). The master controller 101 also issues a control instruction to the network device control unit 105 so as to control the operation of the network device 5 in accordance with an operation control method in the control data which corresponds to the type of detected playback control and the acquired operation state of the network device 5 (step S306).

Subsequently, the master controller 101 controls the playback of video data and the operation of the network device 5 in accordance with a playback control method and operation control method in control data corresponding to the operation state on the basis of the transition (change) of the operation state of the network device 5 until a new playback control request from the user is detected.

If an operation control method for the network device 5 which is set for each type of playback control in accordance with the playback position (elapsed time) of video data is described in control data, the master controller 101 controls the operation of the network device 5 in accordance with the operation control method in the control data which corresponds to the playback position (elapsed time) of the video data which is notified from the video playback control unit 103 in step S306.

Assume that control data contains another playback control method for the video data which corresponds to another operation state of the network device 5 to which transition is made after the operation of the network device 5 is controlled in accordance with the above operation control method. In this case, the master controller 101 controls the operation of the network device 5 in accordance with the above operation control method. Thereafter, if the operation state of the network device 5 which is newly acquired in step S304 coincides with another operation state, the master controller 101 plays back video data in accordance with another playback control method in step S305.

The processing operation of the video player 1 in FIG. 6 and the processing operation of the network device 5 will be described in more detail with reference to FIG. 7 by taking the control data 201 in FIG. 5 as an example. Note that a portion different from the operation in FIG. 4 will be mainly described below.

When the recording medium 2 storing content containing the control data 201 in FIG. 5 and video data 202 is loaded in the video player 1, for example, the following initialization processing is performed. The master controller 101 reads the control data 201 from the recording medium 2 and stores the data in, for example, a memory in the master controller 101. The video playback control unit 103 resets the elapsed time to "0 seconds", and notifies the master controller 101 of the elapsed time "0 seconds". The network device control unit 105 detects an operation state such as the power on/off of the network device 5. Assume that the elapsed time is reset, and the elapsed time "0 seconds" is notified. In this case, when the power on of the network device 5 and "stop" as the operation state of the network device 5 are detected, the master controller 101 is set in the request wait state in which it can receive a request from the user.

Figure 7:
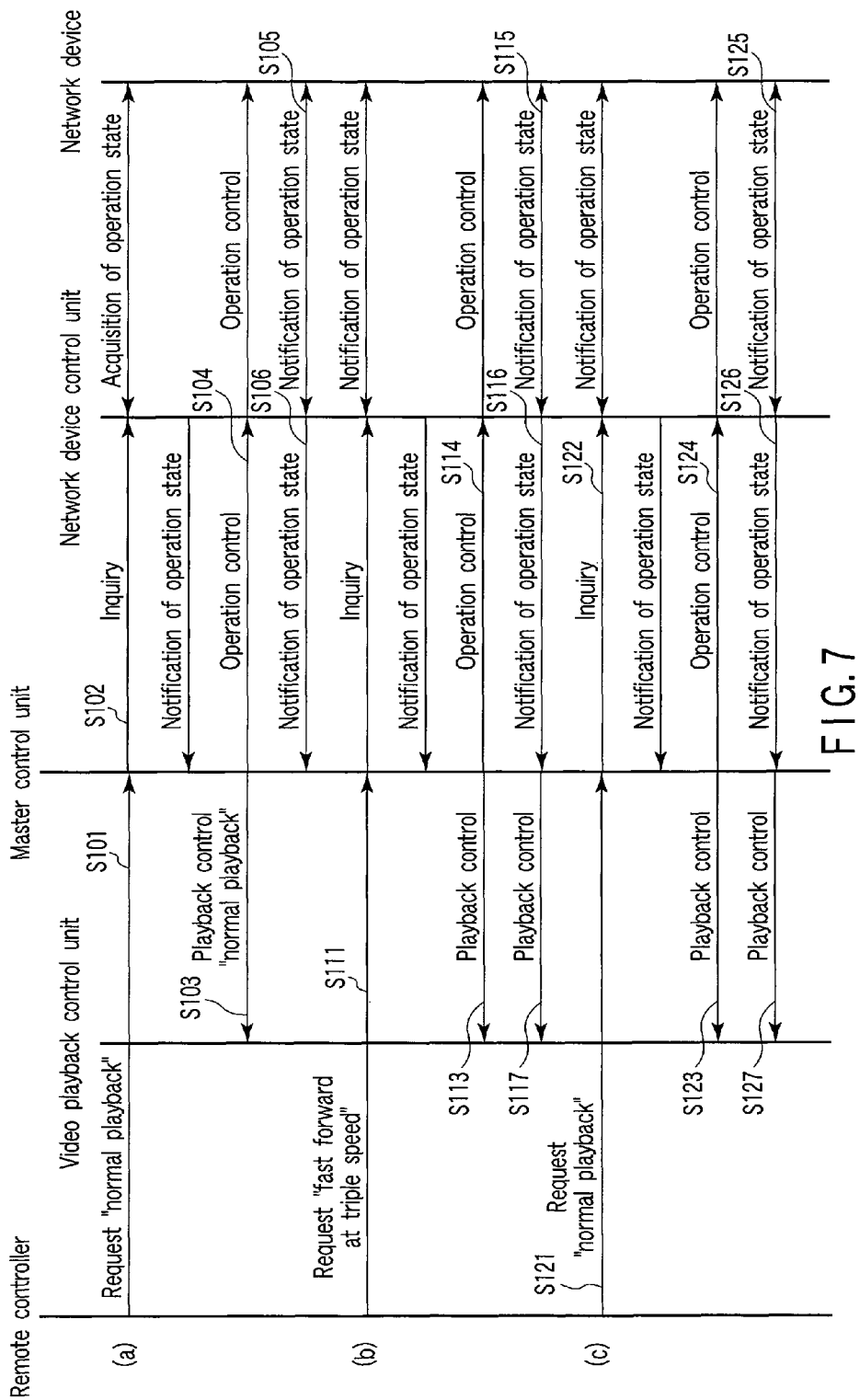
FIG. 7 is a sequence chart for explaining the processing operations of a video player and network device when the control data in FIG. 5 is used.

When the user operates the remote controller 4 in this request wait state and a request detection unit 104 detects a normal playback request, i.e., "normal playback" as the type of detected request (step S101 indicated by "(a)" in FIG. 7), the master controller 101 acquires the current operation state of the network device 5 from the network device control unit 105 (step S102). For example, the master controller 101 inquires the network device control unit 105 of the operation state of the network device 5. In response to this, the network device control unit 105 notifies the master controller 101 of the operation state held in the operation state storage unit 105e. Alternatively, in accordance with an inquiry from the master controller 101, the network device control unit 105 inquires the network device 5 of the current operation state, acquires the operation state from the network device 5, and notifies the master controller 101 of this.

Assume that the operation state of the network device 5 which is acquired from the network device control unit 105 is "at halt". In this case, the master controller 101 acquires the operation control method "operation control at time of normal playback" for the network device 5 which corresponds to the request type "normal playback" and the current operation state "at halt" of the network device 5 and the playback control method "normal playback" for a video in the control data 201 in FIG. 5. The master controller 101 issues a "normal playback" instruction to the video playback control unit 103 (step S103). As "operation control at time of normal playback", for example, the master controller 101 instructs the network device control unit 105 to perform the operation control shown in steps S3 to S11 indicated by "(a)" in FIG. 4 in accordance with the elapsed time (step S104). Upon receiving the "normal playback" instruction, the video playback control unit 103 makes the video playback unit 102 start normal playback of the video data 202 held in the recording medium 2. The operation control unit 105b of the network device control unit 105 transmits, to the network device 5, a control signal for the operation control instructed from the master controller 101 in accordance with the elapsed time to make the network device 5 operate. The main control unit 51 of the network device 5 notifies the network device control unit 105 of the current operation state through the communication unit 52 after starting operation in accordance with the above control signal (for example, in accordance with an inquiry from the network device control unit 105) (step S105). Upon receiving this notification, the operation state acquisition unit 105d of the network device control unit 105 detects that, for example, the operation state has changed from "stop" to "move forward at speed 1", stores the new operation state "move forward at speed 1" in the operation state storage unit 105e, and notifies the master controller 101 of the new operation state "move forward at speed 1" after the change (step S106). Thereafter, as indicated by "(a)" in FIG. 4, the operation of the network device 5 is controlled in accordance with the elapsed time of the video.

Consider next a case in which the user operates the remote controller 4 to issue a "fast forward at triple speed" request, i.e., the request detection unit 104 detects "fast forward at triple speed" as a request type (step S111 indicated by "(b)" in FIG. 7). In this case, the master controller 101 acquires the current operation state of the network device 5 from the network device control unit 105 in the same manner as described above (step S112).

Assume that the operation state of the network device 5 which is acquired from the network device control unit 105 is "at halt". In this case, the master controller 101 acquires the operation control method "move forward at speed 3" for the network device 5 which corresponds to the request type "fast forward at triple speed" and the current operation state "at halt" of the network device 5 and the playback control method "fast forward at double speed" in the control data 201 in FIG. 5 (step S113). The master controller 101 also instructs the network device control unit 105 to perform operation control "fast forward at triple speed" (step S114). Upon receiving the "fast forward at double speed" instruction, the video playback control unit 103 makes the video playback unit 102 fast forward the video data 202 held in the recording medium 2 at double speed. In addition, upon receiving the "move forward at speed 3" instruction, the network device control unit 105 makes the network device 5 run. When the network device control unit 105 makes an inquiry to the network device 5 as needed or at predetermined time intervals after the network device 5 stars running, the main control unit 51 of the network device 5 notifies the network device control unit 105 through the communication unit 52 that, for example, the speed of the network device 5 has gradually increased to reach speed "1" (the operation state of the network device 5 is "move forward at speed 1"), speed "2" (the operation state of the network device 5 is "move forward at speed 2"), and speed "3" (the operation state of the network device 5 is "move forward at speed 3") (step S115). Every time a change in the operation state of the network device 5 is detected, the network device control unit 105 notifies the master controller 101 of the new operation state of the network device after the change (step S116).

Upon being notified of the operation state "move forward at speed 3" of the network device from the network device control unit 105, the master controller 101 acquires the playback control method "fast forward at triple speed" for the video at the time of reaching speed 3 of the network device 5 in the control data 201 in FIG. 5, and issues a "fast forward at triple speed" instruction to the video playback control unit 103 (step S117).

When the request detection unit 104 detects a normal playback request, i.e., "normal playback" as a request type, while the video is fast forwarded at triple speed and the running speed of the network device has reached "3" (step S121) in the above manner, the master controller 101 acquires the current operation state of the network device 5 from the network device control unit 105 as described above (step S122). In this case, since the operation state of the network device 5 which is acquired from the network device control unit 105 is "move forward at speed 3", the master controller 101 acquires the operation control method "stop" for the network device 5 which corresponds to the request type "normal playback" and the current operation state "move forward at speed 3" of the network device 5 and the playback control method "fast forward at double speed" for the video in the control data 201 in FIG. 5, and issues a "fast forward at double speed" instruction to the video playback control unit 103 (step S123). The master controller 101 also instructs the network device control unit 105 to perform operation control "stop" (step S124). Upon receiving the "stop" instruction, the network device control unit 105 performs stop control on the network device 5. However, the network device 5 does not immediately stop but gradually decelerates to a stop.

After starting stop control on the network device 5, the main control unit 51 of the network device 5 notifies the network device control unit 105 of the current running speed as an operation state through the communication unit 52 (in accordance with, for example, an inquiry from the network device control unit 105) (step S125). Upon receiving this notification, the operation state acquisition unit 105d of the network device control unit 105 detects that the operation state has changed from "moving forward at speed 3" to "moving forward at speed 2", "moving forward at speed 1", or "stop", and notifies the master controller 101 of the new operation state after the change (step S126).

Upon being notified of the operation state "at halt" of the network device from the network device control unit 105, the master controller 101 acquires, from the control data 201 in FIG. 5, the playback control method "normal playback" for the video when the network device 5 is completely at halt, and issues a "normal playback" instruction to the video playback control unit 103 (step S127). Thereafter, for example, as indicated by "(a)" in FIG. 4, the operation of the network device 5 may be controlled in accordance with the elapsed time of the video.

As described above, when the user issues a "fast forward" request, the toy car as the network device 5 starts running at the same when the request is detected. As the toy car accelerates, the fast forward speed of the displayed video increases. When the display mode returns from the fast forward mode to the normal playback mode, the playback speed of the video gradually returns to the normal playback speed as the toy car decelerates.

That is, when a video playback request from the user is detected, playback control on the video which corresponds to the current operation state of the network device 5 (e.g., the running speed) is performed on the basis of the request type and the current operation state of the network device 5. In addition, performing operation control on the network device 5 and performing playback control on the video in accordance with a change in the operation state of the network device 5 afterward can synchronize the fast forward speed or the slow playback speed with the operation of the network device 5 at the time of fast forward or slow playback.

Although FIG. 7 shows a case in which the master controller 101 inquires the network device control unit 105 of the operation state of the network device 5 every time a request from the user is detected, the present invention is not limited to this. For example, the network device control unit 105 may notify the master controller 101 of the operation state of the network device 5 every time a change in the operation state is detected, without making the master controller 101 inquire the network device control unit 105, and the master controller 101 may include a memory which stores the current operation state of the network device 5 notified from the network device control unit 105. In this case, when a request from the user is detected, the master controller 101 makes no inquiry to the network device control unit 105. The master controller 101 performs the playback control and operation control described in the control data 201 on the basis of the operation state of the network device 5 which is held in this memory.

As described above, according to the second embodiment, the control data 201 contains a plurality of groups each including (a) one or more playback control methods for the video data 202 corresponding to respective operation states of the network device 5 and (b) one or more operation control methods for the network device 5 corresponding to respective operation states, each group corresponding to one of playback controls including a normal playback control and a special playback control. The video player 1 performs playback control on a video and operation control on the network device 5 on the basis of the control data 201 read from the recording medium 2, the type of required playback control, and the operation state of the network device 5. That is, the video player 1 plays back the video data 202 in the recording medium 2 in accordance with a playback control method in the control data 201 which corresponds to the type of required playback control and the acquired operation state of the network device 5, and controls the operation of the network device 5 in accordance with the operation control method in the control data 201 which corresponds to the type of required playback control and the acquired operation state of the network device 5.

The operation state acquisition unit 105*d* acquires another operation state of the network device 5 after network device 5 is controlled by the operation control unit 105*b* in accordance with the one of the operation control methods. When the another operation state is acquired, the video playback unit 102 plays back the video data 202 in accordance with another playback control method of the playback control methods which corresponds the type of required playback control and the another operation state of the network device 5.

As a consequence, at the time of special playback control, the device 5 can be operated in accordance with the type of special playback control (a video scene, playback speed, playback direction, or the like), and special playback of a video can be performed in synchronism with the operation or the movement of the device 5.

The video players according to first and second embodiments determine a playback control method indicating special playback to be actually performed in accordance with the type of required special playback control and an operation control method for the network device 5 based on the control data 201 in the content. This allows the content creator which provides content to set a behavior at the time of special playback control in advance. Obviously, the video player may comprise, for example, a forcible setting function of always performing control in accordance with required special playback control in consideration of a user who dislikes the behavior intended by the content creator.

Note that the control data 201 according to the first and second embodiments indicates a playback control method for video data which is determined in advance for each type of playback control in accordance with the operation state of the network device 5 and an operation control method for the network device 5. This data may be the following other than those shown in FIGS. 3 and 5.

Assume that the type of required playback control is "chapter jump", and a playback control method for performing "chapter jump" when the operation state of the network device 5 has reached an operation state wherein the operation can synchronize with a scene to be displayed after chapter jump is described in the control data 201. In this case, when a "chapter jump" request is detected, the master controller 101 issues a "chapter jump" instruction to the video playback control unit 103 for the first time when the network device 5 reaches the designated operation state instead of immediately making a chapter jump. Using such a playback control method makes it possible to form a content in which a video can be synchronized with the network device 5 regardless of any type of chapter jump.

If, for example, a playback control method of, when the type of required playback control is "fast forward" and playback reaches a given important scene (reaches the elapsed time corresponding to a given important scene) at the time of execution of fast forward of the video, causing the network device 5 with a voice output function to output a message stating that the scene is important and it is preferable not to perform fast forward, or to make a simple comment on the scene is described in the control data 201, it is possible to form a content which allows the user to enjoy the execution of special playback itself.

As described above, according to the first and second embodiments, a content creator designates in advance video playback control at the time of issuing a special playback control request and at the execution of the required special playback control and operation control on the network device 5 as the control data 201. This allows the user to variously perform playback operation control on the network device 5 and video playback control in accordance with the intention of the content creator, even if the user issues a special playback control request at the time of viewing and listening to the content.

The respective components (the master controller 101, video playback unit 102, video playback control unit 103, request detection unit 104, and network device control unit 105) of the video player 1 can also be distributed as computer-executable programs by being stored in recording media such as magnetic disks (flexible disks, hard disks, and the like), optical disks (CD-ROMs, DVDs, and the like), and semiconductor memories. The video player 1 can be implemented by making a general-purpose computer execute the programs.

What is claimed is:

1. A video player capable of playing back video data stored in a recording medium and capable of controlling a control target apparatus via a network, the video player comprising:
    a reader that reads, from the recording medium storing the video data and control data, the control data which includes a plurality of operation control methods for the control target apparatus, each of the plurality of operation control methods being set, based on one of a plurality of playback controls and an elapsed time indicating a playback position from a head of the video data, for one of the plurality of playback controls including a normal playback control and a special playback control; and
    a general-purpose computer that executes:
    a measurement unit configured to measure the elapsed time at a same time as a start of the playback of the video data;
    a detection unit configured to detect one of the plurality of playback controls which is required, to obtain a detected playback control;

a video playback unit configured to play back the video data in the recording medium in accordance with a playback control method corresponding to the detected playback control; and a control unit configured to control operation of the control target apparatus in accordance with the operation control method in the control data which corresponds to the detected playback control and the measured elapsed time.

2. The video player according to claim 1, wherein
the control data includes a plurality of playback control methods for the video data, each playback control method being set for one of the playback control, and
the video playback unit plays back the video data in accordance with one of the playback control methods in the control data which corresponds to the detected playback control.

3. The video player according to claim 1, wherein each of the plurality of operation control methods is set in accordance with the playback position of the video data.

4. The video player according to claim 1, wherein
the control data includes another playback control method, which the video playback unit should be followed after the control target apparatus is controlled by the control unit in accordance with the one of the operation control methods and reaches a predetermined state, and
the video playback unit plays back the video data in accordance with the another playback control method after the control target apparatus reaches the predetermined state.

5. The video player according to claim 1, wherein the playback controls include a first special playback control of playing back the video data at a playback speed different from a normal playback speed and/or a second special playback control of changing a playback start position.

6. A video player capable of playing back video data stored in a recording medium and capable of controlling a control target apparatus via a network, the video player comprising:
a reader that reads, from the recording medium storing the video data and control data, the control data which includes a plurality of groups each including (a) one or more playback control methods for the video data corresponding to respective operation states of the control target apparatus and (b) one or more operation control methods for the control target apparatus corresponding to respective operation states, each group corresponding to one of a plurality of playback controls including a normal playback control and a special playback control; and
a general-purpose computer that executes:
a detection unit configured to detect one of the playback control which is required, to obtain a detected playback control;
an acquisition unit configured to acquire an operation state of the control target apparatus, to obtain a first operation state of the control target apparatus when the playback control is detected;
a video playback unit configured to play back the video data in the recording medium in accordance with a first playback control method of the playback control methods in the control data which corresponds to the detected playback control and the first operation state; and
a control unit configured to control operation of the control target apparatus by transmitting a control signal for controlling the operation of the control target apparatus in accordance with one of the operation control methods in the control data which corresponds to the detected playback control and the first operation state.

7. The video player according to claim 6, wherein
the acquisition unit acquires a second operation state of the control target apparatus after the control target apparatus is controlled by the control unit in accordance with the one of the operation control methods, and
when the second operation state is acquired, the video playback unit plays back the video data in accordance with a second playback control method of the playback control methods which corresponds the detected playback control and the second operation state.

8. The video player according to claim 6, wherein the playback controls include a first special playback control of playing back the video data at a playback speed different from a normal playback speed and/or a second special playback control of changing a playback start position.

9. A control target apparatus comprising:
a notifying unit configured to notify the operation state of the control target apparatus to the video player according to claim 6; and
a receiver to receive the control signal.

10. A video playback method comprising:
reading, from a recording medium storing video data and control data, the control data which includes a plurality of operation control methods for a control target apparatus, each of the plurality of operation control methods being set, based on one of a plurality of playback controls and an elapsed time indicating a playback position from a head of the video data, for one of a plurality of playback controls including a normal playback control and a special playback control;
measuring the elapsed time at a common time as a start of playback of the video data;
detecting one of the playback controls which is requires, to obtain a detected playback control;
playing back the video data in the recording medium in accordance with a playback control method corresponding to the detected playback control; and
controlling operation of the control target apparatus in accordance with one of the operation control methods in the control data which corresponds to the detected playback control and the measured elapsed time.

11. A video playback method comprising:
reading, from a recording medium storing a video data and control data, the control data which includes a plurality of groups each including (a) one or more playback control methods for the video data corresponding to respective operation states of a control target apparatus and (b) one or more operation control methods for the control target apparatus corresponding to respective operation states, each group corresponding to one of a plurality of playback controls including a normal playback control and a special playback control;
detecting one of the playback control which is required, to obtain a detected playback control;
acquiring an operation state of the control target apparatus, to obtain a first operation state of the control target apparatus when the playback control is detected;
playing back the video data in the recording medium in accordance with a first playback control method of the playback control methods in the control data which corresponds to the detected playback control and the first operation state; and
controlling operation of the control target apparatus in accordance with one of the operation control methods in the control data which corresponds to the detected playback control and the first operation state.

\* \* \* \* \*